United States Patent [19]

Baney et al.

[11] Patent Number: 5,116,637
[45] Date of Patent: May 26, 1992

[54] AMINE CATALYSTS FOR THE LOW TEMPERATURE CONVERSION OF SILICA PRECURSORS TO SILICA

[75] Inventors: Ronald H. Baney; Carl J. Bilgrien, both of Midland; Dennis W. Broderick, Rhodes; Leslie E. Carpenter, II, Midland, all of Mich.

[73] Assignee: Dow Corning Corporation, Midland, Mich.

[21] Appl. No.: 532,705

[22] Filed: Jun. 4, 1990

[51] Int. Cl.$^5$ .................. B05D 3/04; B05D 3/10
[52] U.S. Cl. .................. 427/340; 427/126.2; 427/126.4; 427/226; 427/344; 427/377; 427/387; 427/397.7
[58] Field of Search .............. 427/226, 340, 397.7, 427/126.2, 126.4, 344, 377, 387

[56] References Cited

U.S. PATENT DOCUMENTS

| | | | |
|---|---|---|---|
| 3,923,705 | 12/1975 | Smith | 528/15 |
| 4,384,013 | 5/1983 | Noren | 427/340 |
| 4,636,440 | 1/1987 | Jada | 428/446 |
| 4,749,631 | 6/1988 | Haluska . | |
| 4,756,977 | 7/1988 | Haluska . | |
| 4,842,888 | 6/1989 | Haluska . | |
| 4,847,162 | 7/1989 | Haluska . | |
| 4,900,582 | 2/1990 | Nakayama | 427/299 |
| 4,911,992 | 3/1990 | Haluska et al. | 427/397.7 |
| 5,059,448 | 10/1991 | Chandra et al. | 427/126.4 |
| 5,063,267 | 11/1991 | Hanneman et al. | 427/226 |

FOREIGN PATENT DOCUMENTS 57-118592 7/1982 Japan .
62-265129 11/1987 Japan .

OTHER PUBLICATIONS

W. Noll, "Chemistry & Technology of Silicones", Academic Press, NY, N.Y. (1968), pp. 205, 213.
R. L. Merker, et al., J Polymer Science-Part A, vol. 2, pp. 31-44 (1964).
J. of Non-Crystalline Solids, 64, 209-221 (1984).

Primary Examiner—Michael Lusignan
Assistant Examiner—Diana L. Dudash
Attorney, Agent, or Firm—Roger E. Gobrogge

[57] ABSTRACT

This invention relates to a low temperature method of converting coatings of hydrogen silsesquioxane resin or hydrolyzed or partially hydrolyzed $R_xSi(OR)_{4-x}$ to ceramic silica coatings. The method comprises applying a silica precursor coating to a substrate, exposing the coating to an environment comprising an amine and subjecting the coating to a temperature sufficient to yield the ceramic coating. The methods of the invention are particularly applicable to applying coatings on electronic devices.

24 Claims, No Drawings

AMINE CATALYSTS FOR THE LOW TEMPERATURE CONVERSION OF SILICA PRECURSORS TO SILICA

BACKGROUND OF THE INVENTION

This invention relates to a low temperature method of converting silica precursor coatings to ceramic silica coatings. The method comprises applying a silica precursor coating to a substrate, exposing the coating to an environment comprising an amine and subjecting the coating to a temperature sufficient to yield the ceramic coating. The methods of the invention are particularly applicable to applying coatings on electronic devices.

Thin film ceramic coatings on electronic devices and circuits have recently been shown to be valuable for their protective and dielectric effect. As protective agents, these thin films can assure reliability and extended service life of the electronics under a variety of environmental conditions such as moisture, heat and abrasion. As dielectric agents, these films can inhibit electrical conduction in many applications such as the interlevel dielectric in multilayer devices.

The art suggests several methods for the application of ceramic coatings. For instance, Haluska et al, in U.S. Pat. Nos. 4,749,631 and 4,756,977, which are incorporated herein by reference, disclose silica based coatings produced by applying solutions of silicon alkoxides or hydrogen silsesquioxane, respectively, to an electronic device and then heating to temperatures of 200°–1000° C. These same references also describe the application of other silicon-containing coatings such as silicon carbide, silicon nitride or silicon carbonitride onto the initial silica layer for added protection or dielectric effect. The ceramic coatings produced thereby have many desirable characteristics such as microhardness, moisture resistance, ion barrier, adhesion, ductility, tensile strength, low electrical conductance and thermal expansion coefficient matching that make these coatings especially valuable.

The art also suggests forming ceramic coatings in anhydrous ammonia environments. For instance, Haluska et al. in U.S. Pat. Nos. 4,847,162 and 4,842,888 teach the formation of nitrided ceramic coatings by heating hydrogen silsesquioxane resin or silicate esters, respectively, to a temperature of between 200° and 1000° C. in the presence of ammonia. These references teach that anhydrous ammonia creates a reactive atmosphere which allows for low temperature (>200° C.) conversion to nitrided silica coatings. Similarly, Glasser et al. in the Journal of Non-Crystalline Solids 64 (1984) pp. 209–221 teach the formation of nitrided ceramic coatings by heating tetraethoxysilane in the presence of anhydrous ammonia.

In addition, the art teaches the incorporation of various amines into alkyl orthosilicate solutions for use as hydrolysis catalysts. For instance, Hitachi in Japanese Patent J62265129 teaches the incorporation of an amine in a silicon alkoxide solution to form a silica sol for use in producing silica glass. Similarly, Kanegafuchi in Japanese Patent J57118592 teaches the incorporation of an amine into an alcoholic solution of a trialkoxysilane to form a stable composition.

Despite the efficacy of the above coatings, ceramification at temperatures less than 400° C. is so slow that commercial applications are impractical. Utilizing temperatures greater than 400° C., on the other hand, can destroy various temperature sensitive devices. Therefore, a need exists for a method of rapidly applying ceramic coatings at low temperatures.

Jada in U.S. Pat. No. 4,636,440 discloses a method of reducing the drying time for a sol-gel coated substrate comprising exposing the coated substrate to aqueous quaternary ammonium hydroxide and/or alkanol amine compounds. This reference, however, is specifically limited to alkanol amines of the formula $H_2NR^1OH$, wherein $R^1$ represents a $C_1$ to $C_{10}$ alkylene group.

The present inventors have now discovered that by exposing either of two different types of silica precursor coatings to amines, a ceramic silica coating can be obtained on various substrates, including electronic devices, at temperatures as low as room temperature.

SUMMARY OF THE INVENTION

This invention relates to a method of forming a ceramic coating on a substrate. The method comprises coating said substrate with a solution comprising a solvent and hydrogen silsesquioxane resin. The solvent is evaporated to deposit a preceramic coating of hydrogen silsesquioxane on said substrate. The hydrogen silsesquioxane coating is exposed to an environment comprising an amine to catalyze the conversion of the hydrogen silsesquioxane coating to a silica coating. The catalyzed coating is then subjected to a temperature sufficient for ceramification.

This invention also relates to a method of forming a ceramic coating on a substrate comprising coating said substrate with a solution comprising a solvent and hydrolyzed or partially hydrolyzed $R_xSi(OR)_{4-x}$, in which R is an aliphatic, alicyclic or aromatic substituent of 1–20 carbon atoms and x is 0–2. The solvent is evaporated to deposit a preceramic coating on said substrate. The preceramic coating is exposed to an environment comprising an amine to catalyze the conversion of the preceramic coating to a silica coating, provided the amine is not an alkanol amine. The catalyzed coating is then subjected to a temperature sufficient for ceramification.

DETAILED DESCRIPTION OF THE INVENTION

The present invention is based on the discovery that amines can assist in converting certain types of silica precursor coatings to ceramic silica coatings at low temperatures. The amine precursors herein are thought to act as catalysts in the hydrolysis SiH and SiOR and in the condensation of SiOH bonds.

The methods of this invention are particularly applicable to the deposition of protective or dielectric coatings on electronic devices, electronic circuits or plastics including for example. polyimides, epoxides polytetrafluoroethylene and copolymers thereof, polycarbonates, acrylics and polyesters. However, the choice of substrates and devices to be coated by the instant invention is limited only by the need for thermal and chemical stability of the substrate at the temperature and atmosphere used in the present invention, The coatings taught herein also may serve as interlevel dielectric layers, doped dielectric layers to produce transistor like devices, pigment loaded binder systems containing silicon to produce capacitor and capacitor like devices multilayer devices, 3-D devices, silicon on insulator devices, super lattice devices and the like.

As used in the present invention, the expression "ceramic" includes ceramics such as amorphous silica and ceramic-like materials such as amorphous silica-like materials that are not fully free of residual carbon and/or hydrogen but are otherwise ceramic in character; the expression "hydrolyzed or partially hydrolyzed" is used to designate a silane or mixture of silanes that have been treated with aqueous and/or basic or acidic conditions to hydrolyze either all or a portion of the hydrolyzable substituents on the silane the expressions "hydrogen silsesquioxane resin" or "H-resin" are meant to include those hydridosilane resins which are fully condensed $(HSiO_{3/2})_n$ as well as those which are only partially hydrolyzed and/or partially condensed and, thereby, may contain residual SiOR and/or SiOH substituents; and the expressions "electronic device" or "electronic circuit" include, but are not limited to, silicon based devices, gallium arsenide based devices focal plane arrays, optoelectronic devices, photovoltaic cells and optical devices.

The silica precursors that are useful in the invention include hydrogen silsesquioxane resin (H-resin), hydrolyzed or partially hydrolyzed $R_xSi(OR)_{4-x}$, or combinations of the above materials, in which R is an aliphatic, alicyclic or aromatic substituent of 1–20 carbon atoms such as an alkyl (eg. methyl, ethyl, propyl), alkenyl (eg. vinyl or allyl), alkynl (eg. ethynl), cyclopentyl cyclohexyl phenyl etc. and x is 0–2.

As defined above, H-resin is used in this invention to describe hydridosilane resins which may be fully condensed as well as those which are only partially hydrolyzed and/or condensed. Exemplary of fully condensed H-resins are those formed by the process of Frye et al. in U.S. Pat. No. 3,615,272 which is incorporated herein by reference. This polymeric material has units of the formula $(HSiO_{3/2})_n$ in which n is generally 10–1000. The resin has a number average molecular weight of from about 800–2900 and a weight average molecular weight of between about 8000–28,000. When heated sufficiently, this material yields a ceramic coating essentially free of SiH bonds.

Exemplary H-resins which may not be fully condensed (polymers containing units of the formula $HSi(OH)_xO_{3-x/2}$) are those of Banks et al. in U.S. Pat. No. 5,010,159, or those of Frye et al. in U.S. Pat. No. 4,999,397, both of which are incorporated herein by reference. Banks et al. describe a process which comprises hydrolyzing hydridosilanes in an arylsulfonic acid hydrate hydrolysis medium to form a resin, which is then contacted with a neutralizing agent. Recent experimentation has shown that an especially preferred H-resin which forms substantially crack-free coatings may be prepared by this method in which the acid/silane ratio is greater than about 2.67:1, preferably about 6/1. Frye et al. describes a process which comprises hydrolyzing trichlorosilane in a non-sulfur containing polar organic solvent by the addition of water or HCl and a metal oxide. The metal oxide therein acts as a HCl scavenger and, thereby, serves as a continuous source of water.

Exemplary H-resin which is not fully hydrolyzed or condensed are soluble polymers having units of the formula $HSi(OH)_x(OR)_yO_{z/2}$, in which each R is independently an organic group which, when bonded to silicon through the oxygen atom, forms a hydrolyzable substituent, $x=0-2$, $y=0-2$, $z=1-3$, $x+y+z=3$ and the average value of y over all of the units of the polymer is greater than 0. Examples of R groups in the above equation include alkyls of 1–6 carbon atoms such as methyl, ethyl, propyl etc., aryls such as phenyl and alkenyls such as vinyl. These resins may be formed by a process which comprises hydrolyzing a hydrocarbonoxy hydridosilane with water in an acidified oxygen-containing polar organic solvent.

Exposure of H-resin to the amines as taught herein unexpectedly catalyzes both the hydrolysis of the SiH and any SiOR bonds to SiOH as well as the condensation of this material to silica. It is to be noted that some moisture, such as that available in an ambient environment, is generally necessary for the hydrolysis of SiH bonds. The silica formed thereby has either no or a very low concentration of SiH, SiOR and/or SiOH. Generally, at least about 90% of said SiH, SiOR and/or SiOH bonds are removed, and preferably at least about 95% of said SiH, SiOR and/or Si-H bonds are removed.

The second type of silica precursor materials useful herein are hydrolyzed or partially hydrolyzed compounds of the formula $R_xSi(OR)_{4-x}$ in which R and x are as defined above. Specific compounds of this type include those in which the silicon atom is bonded to groups other than hydrolyzable substituents (i.e.: $x=1-2$) such as methyltriethoxysilane, phenyltriethoxysilane, diethyldiethoxysilane, methyltrimethoxysilane, phenyltrimethoxysilane and vinyltrimethoxysilane. Compounds in which $x=2$ are generally not used alone as volatile cyclic structures are generated during pyrolysis, but minor amounts of said compounds may be cohydrolyzed with other silanes to prepare useful preceramic materials. Other compounds of this type include those in which the silicon is solely bound to hydrolyzable substituents (i.e., $x=0$) such as tetramethoxysilane, tetraethoxysilane, tetrapropoxysilane, and tetrabutoxysilane.

The addition of water to a solution of these compounds in an organic solvent results in hydrolysis or partial hydrolysis. Generally, a small amount of an acid or base is used to facilitate the hydrolysis reaction. The resultant hydrolysates or partial hydrolysates may comprise silicon atoms bonded to C, OH or OR groups, but a substantial portion of the material is believed to be condensed in the form of soluble Si-O-Si resins. Treatment of these materials with amines as taught herein catalyzes further hydrolysis and/or condensation to result in silica with either no or a very low concentration of SiOR and/or SiOH. Generally, at least about 90% of said SiOR and/or SiOH bonds are removed, and preferably at least about 95% of said SiOR and/or SiOH bonds are removed.

Additional silica precursor materials which may function equivalently in this invention include condensed esters of the formula $(RO)_3SiOSi(OR)_3$, disilanes of the formula $(RO)_xR_ySiSiR_y(OR)_x$, compounds containing structural units such as SiOC in which the carbon containing group is hydrolyzable under the thermal conditions, or any other source of SiOR.

The above silica precursor materials are dissolved in a solvent to form a solution for application. Various facilitating measures such as stirring and/or heat may be used to assist in this dissolution. The solvent to be used in the instant invention can be any agent or mixture of agents which will dissolve the silica precursor to form a homogenous solution without affecting the ceramic coating. These solvents can include, for example, alcohols such as ethyl or isopropyl, aromatic hydrocarbons such as benzene or toluene, alkanes such as n-heptane or dodecane, ketones, esters, glycol ethers, or cyclic dimethylsiloxanes, in an amount sufficient to dissolve the above materials to low solids. Generally, enough of the above solvent is used to form a 0.1–50 weight percent solution.

In addition to the above silica precursors, a modifying ceramic oxide precursor also may be included in the coating solution. The modifying ceramic oxide precursors which may be used herein include compounds of various metals such as aluminum, titanium, zirconium, tantalum, niobium and/or vanadium as well as various non-metallic compounds such as those of boron or phosphorous, The expression "modifying ceramic oxide precursor", therefore, is meant to include such metal and non-metal compounds having one or more hydrolyzable groups bonded to the above metal or non-metal. Examples of hydrolyzable groups include, but are not limited to, alkoxy, such as methoxy, ethoxy, propoxy etc., acyloxy, such as acetoxy, or other organic groups bonded to said metal or non-metal through an oxygen. These compounds must form homogenous solutions when mixed with the silica precursors and must be capable of being hydrolyzed, and subsequently pyrolyzed, at relatively low temperatures and relatively rapid reaction rates to form modifying ceramic oxide coatings. When such modifying ceramic oxide precursors are used, they are generally present in the preceramic mixture in an amount such that the final ceramic coating contains 0.1 to 30 percent by weight modifying ceramic oxide.

If H-resin is to be combined with modifying ceramic oxide precursors in the above coating solution, both materials may simply be dissolved in the solvent and allowed to stand at room temperature for a time sufficient to allow the modifying ceramic oxide precursor to react into the structure of the H-resin. Generally, a period of greater than about 2 hours is necessary for said reaction to occur. The solution formed thereby may then be applied to the substrate as discussed infra. Alternatively, the modifying ceramic oxide precursor may be hydrolyzed or partially hydrolyzed, dissolved in the solution comprising the solvent and the H-resin and then immediately applied to the substrate. Various facilitating measures such as stirring or agitation may be used as necessary to produce said solutions.

If compounds of the formula $R_xSi(OR)_{4-x}$ are to be mixed with modifying ceramic oxide precursors, either or both of these compounds may be hydrolyzed or partially hydrolyzed before or after mixing. For highly reactive modifying ceramic oxide precursors such as compounds with propoxide, isopropoxide, butoxide, isobutoxide or acetylacetonate substituents, it is preferred that the modifying ceramic oxide precursors and compounds of the formula $R_xSi(OR)_{4-x}$ be premixed and heated to reflux in ethanol for 24 hours to afford a homogenous reaction mixture that can be hydrolyzed uniformly and at a controlled rate. Attempts to hydrolyze a mixture of the above mentioned highly reactive ceramic oxide precursors and compounds of the formula $R_xSi(OR)_{4-x}$ without the pre-reaction step results in preferential and rapid hydrolysis of the modifying ceramic oxide precursor over that of the $R_xSi(OR)_{4-x}$, resulting in rapid, nonhomogenous gelation of the reaction mixture.

An alternate method of cohydrolyzing the reactive modifying ceramic oxide precursors and compounds of the formula $R_xSi(OR)_{4-x}$ would be to hydrolyze the $R_xSi(OR)_{4-x}$, followed by adding the reactive modifying ceramic oxide precursor and less than or equal to a stoichiometric amount of water for hydrolyzing said modifying ceramic oxide precursor to the hydrolysate solution. When the hydrolysis of this mixture is facilitated as discussed supra, a uniform, soluble hydrolysate results.

If H-resin is used in the coating solution, a platinum or rhodium catalyst also may be included to increase the rate and extent of its conversion to a ceramic coating. Any platinum or rhodium compound or complex that can be solubilized in this solution will be operable. For instance, an organoplatinum composition such as platinum acetylacetonate or rhodium catalyst $RhCl_3[S(CH_2CH_2CH_2CH_3)_2]_3$, obtained from Dow Corning Corporation. Midland, Mich., are all within the scope of this invention. The above catalysts are generally added to the solution in an amount of between about 15 to 500 ppm platinum or rhodium based on the weight of H-resin in solution.

The solution comprising the silica precursor, a solvent, and, optionally, a modifying ceramic oxide precursor and/or a platinum or rhodium catalyst is then coated onto the substrate, The method of coating can be, but is not limited to, spin coating, dip coating, spray coating or flow coating.

The solvent is allowed to evaporate from the coated substrate resulting in the deposition of a preceramic coating. Any suitable means of evaporation may be used such as simple air drying by exposure to an ambient environment or by the application of a vacuum or mild heat. It is to be noted that when spin coating is used, an additional drying period is generally not necessary as the spinning drives off the solvent.

The preceramic coating applied in the above manner may optionally be precured to assure that the coating remains adhered to the substrate during amine exposure. This precure is generally accomplished by applying mild heat to the preceramic coating for a short period of time. For instance, most coatings may be precured by heating in air to about 50°–250° C. for about 0.25–1 hours.

The preceramic coating applied by the above methods is then exposed to an environment comprising an amine. As noted earlier, some moisture, such as that present in an ambient environment, should also generally be present for the hydrolysis of SiH bonds. The amines useful herein may be primary amines ($RNH_2$), secondary amines ($R_2NH$) and/or tertiary amines ($R_3N$) in which R is independently (1) a saturated or unsaturated aliphatic such as methyl, ethyl, propyl, vinyl, allyl, ethynyl etc., (2) an alicyclic such as cyclohexylmethyl, (3) an aromatic such as phenyl, (4) a substituted hetero atom such as oxygen, nitrogen, sulfur etc. or (5) compounds in which the nitrogen atom is a member of a heterocyclic ring such as quinoline, pyrrolidine or pyridine. In addition, any of the above amine compounds may be substituted with other hydrocarbon and/or hetero containing groups to form compounds such as diamines, amides etc. Finally, it is also contemplated that compounds which are converted to amines under the reaction conditions used would function in an equivalent manner. For example, a compound such as an ammonium salt which yields an amine upon dissolution would provide the desired catalytic effect.

Examples of the specific compounds that may be used herein include methylamine, ethylamine, butylamine, allylamine, cyclohexylamine, aniline, dimethylamine, diethylamine, dioctylamine, dibutylamine, methylethylamine, saccharin, piperidine, trimethylamine, triethylamine, pyridine, diethyl toluidene ethylmethylpropylamine, imidazole, choline acetate, triphenyl phosphene analine, trimethylsilylimidazole, ethylenediamine, diethylhydroxylamine, triethylenediamine, n-methylpyrolidone etc.

The above amines may be used in a gaseous or liquid state to provide the desired catalytic environment. Gaseous environments may be generated by any convenient method such as, for example, the use of an amine gas or by heating a solid or liquid amine to its vaporization point. Such gases may then be used either in a concentrated form or they may be diluted with air or other gaseous agents to provide an acceptable reactive environment.

The method used to bring the preceramic coating into contact with the gaseous environment is not critical and may be by any convenient means. For instance, the coated substrate can be placed in a container and the gaseous environment introduced therein. Alternatively, the coated substrate may be placed in a stream of the gaseous amines by, for example, suspending the coated substrate over a beaker of boiling amines.

As with the gaseous environments, the method of forming the liquid amine environment is not critical and may be by any convenient means. For instance, an amine which is liquid at room temperature or a solid amine heated above its melting point may each be used either in a neat or dilute form. Alternatively, a solid amine may be dissolved and, if desired, diluted in a suitable solvent to any concentration desired.

The method used to bring the preceramic coating into contact with the liquid environment is also not critical and may be by any convenient means. Methods such as immersion or continuous flushing, however, are specifically contemplated herein. In addition, vacuum infiltration may also be used to increase the penetration of the amine into the surface of the coating.

The above exposure to either the liquid or the gaseous environment should be for a time and at a temperature and atmospheric pressure sufficient to assist in the conversion of the preceramic coating to a silica coating. Generally, temperatures in the range of from about room temperature (20°-30° C.) to about 400° C. (or the boiling point of the liquid amine if it is to be used in its liquid state) may be used herein with a range of from about room temperature to about 200° C. being even more preferred. The atmospheric pressure used can be from below atmospheric pressure (vacuum) up to super atmospheric pressure. From a practical standpoint, it is desirable that the exposure occur at about room temperature and atmospheric pressure.

The preferred exposure time is that which is effective for catalyzing the conversion of the preceramic coating to silica. Generally, exposures of up to about 6 hours are preferred with exposures in the range of from about 15 minutes up to about 6 hours being more preferred and those from about 1 to 3 hours being even more preferred. Longer times may be used, but no significant benefit is generally obtained.

After the preceramic coating is exposed to one of the above environments, it is then subjected to a temperature sufficient for ceramification. Alternatively, the coating may be washed with a suitable solvent such as toluene prior to subjecting it to the sufficient temperature. In either case, the sufficient temperature is generally about room temperature or above with a range of from about 20° C. to about 400° C. being preferred, a range of about 20° up to about 200° C. being more preferred, and a range of about 20° up to about 190° C. being even more preferred. It is to be noted that this ceramification step may involve simply maintaining the catalyzing amine environment and/or the catalysis temperature for a time sufficient for silica conversion. Higher temperatures usually result in quicker ceramification, but said temperatures may also have detrimental effects on various temperature sensitive substrates.

The catalyzed preceramic coatings are subjected to such a temperature for a time sufficient to ceramify the coating. Generally, this time is up to about 6 hours with a range of between about 0.5 and about 6 hours being preferred and a range of between about 0.5 and 2 hours being more preferred.

Any method of heating such as the use of a convection oven or radiant or microwave energy is generally functional herein. The rate of heating, moreover, is also not critical, but it is most practical and preferred to heat as rapidly as possible.

In a typical ceramification procedure, the coated substrate which has been exposed to one of the above amine environments may be placed in a convection oven. The temperature in the oven is then raised to the desired level (such as about 150° C.) and maintained for the desired time (such as about 0.5-2 hours).

The expressions "ceramification" or "ceramify" as used herein are meant to indicate that most of the carbon and hydrogen has been removed from the coating. Such "ceramic" coatings may, however, be heated to higher temperatures or for longer durations to facilitate removal of any minor amounts of carbon or hydrogen remaining and to increase the density of the coatings.

By the above methods a thin (less than 2 microns) ceramic planarizing coating is produced on the substrate. The coating smooths the irregular surfaces of various substrates and has excellent adhesive properties. In addition, the coating may be covered by other coatings such as further $SiO_2$ coatings. $SiO_2$/modifying ceramic oxide layers, silicon containing coatings. silicon carbon containing coatings, silicon nitrogen containing coatings and/or silicon nitrogen carbon containing coatings.

In a dual layer system, the second passivation layer may comprise silicon containing coatings, silicon carbon-containing coatings, silicon nitrogen-containing coatings, silicon carbon nitrogen containing coatings or an additional silicon dioxide and modifying ceramic oxide coating. In a triple layer system, the second passivation layer may comprise silicon carbon-containing coatings, silicon nitrogen-containing coatings, silicon carbon nitrogen containing coatings or an additional silicon dioxide and modifying ceramic oxide coating and the third barrier coating may comprise silicon coatings, silicon carbon-containing coatings, silicon nitrogen-containing coatings, and silicon carbon nitrogen containing coatings.

The silicon containing coating described above is applied by a method selected from the group consisting of (a) chemical vapor deposition of a silane, halosilane, halodisilane, halopolysilane or mixtures thereof, (b) plasma enhanced chemical vapor deposition of a silane, halosilane, halodisilane, halopolysilane or mixtures thereof, or (c) metal assisted chemical vapor deposition of a silane, halosilane, halodisilane, halopolysilane or mixtures thereof. The silicon carbon coating is applied by a means selected from the group consisting of (1) chemical vapor deposition of a silane, alkylsilane, halosilane, halodisilane, halopolysilane or mixtures thereof in the presence of an alkane of one to six carbon atoms or an alkylsilane, (2) plasma enhanced chemical vapor deposition of a silane, alkylsilane, halosilane, halodisilane. halopolysilane or mixtures thereof in the presence of an alkane of one to six carbon atoms or an alkylsilane or (3) plasma enhanced chemical vapor deposition of a silacyclobutane or disilacyclobutane as further described in U.S. patent application Ser. No. 07/336.927, which is incorporated herein in its entirety. The silicon nitrogen-containing coating is deposited by a means selected from the group consisting of (A) chemical vapor deposition of a silane. halosilane, halodisilane, halopolysilane or mixtures thereof in the presence of ammonia. (B) plasma enhanced chemical vapor deposition of a silane, halosilane, halodisilane, halopolysilane, or mixtures thereof in the presence of ammonia or (C) ceramification of a silicon and nitrogen containing preceramic polymer, The silicon carbon nitrogen-containing coating is deposited by a means selected from the group consisting of (i) chemical vapor deposition of hexamethyldisilazane, (ii) plasma enhanced chemical vapor deposition of hexamethyldisilazane, (iii) chemical vapor deposition of silane, alkylsilane, halosilane, halodisilane, halopolysilane or mixture thereof in the presence of an alkane of one to six carbon atoms or an alkylsilane and further in the presence of ammonia, (iv) plasma enhanced chemical vapor deposition of a silane, alkylsilane, halosilane, halodisilane, halopolysilane or mixture thereof in the presence of an alkane of one to six carbon atoms or an alkylsilane and further in the presence of ammonia and (v) ceramification of a preceramic solution comprising a carbon substituted polysilazane, polysilacyclobutasilazane or polycarbosilane in the presence of ammonia. The silicon dioxide and modifying ceramic oxide coating is applied by the ceramification of a preceramic mixture comprising a silicon dioxide precursor and a modifying ceramic oxide precursor as in the initial coating.

Coatings produced by the instant invention possess low defect density and are useful on electronic devices as protective coatings, as corrosion resistant and abrasion resistant coatings, as temperature and moisture resistant coatings, as dielectric layers in, for instance, multilayer devices and as a diffusion barrier against ionic impurities such as sodium and chloride.

The following non-limiting examples are included so that one skilled in the art may more readily understand the invention.

EXAMPLE 1

H-resin, prepared by the method of Collins et al., U.S. Pat. No. 3,615,272, was diluted to 16 weight percent solids in a cyclic dimethylsiloxane solvent which contained about 0.01 g platinum acetylacetonate per gram solvent. A 4 inch silicon wafer was coated with this solution and spun at 3000 rpm for 10 seconds. The wafer was allowed to dry to a tack free state (about 1 hour) and then precured at 250° C. for 1 hour.

The wafer was scored and broken into 1 inch square pieces. The 1 inch square wafer pieces were then exposed to the amines in their liquid state; liquid amines were used neat and solid amines were dissolved in a suitable solvent. The exposure occurred in the following fashion:

The wafer piece was placed in a beaker and flooded with the amine. Vacuum was applied to the flooded wafer to 28 inches of mercury and then discontinued. The same vacuum application was repeated 2 additional times. After the third vacuum application, the wafer was allowed to soak in the amine for 1 hour.

The wafer was then removed from the amine solution, rinsed with dry toluene and heated in a furnace for 1 hour at 100° C.

The amount of SiH remaining after the above procedure was measured by comparing the FTIR Si-H peak at 2260cm$^{-1}$ before and after the above procedure and then calculating the percentage that was removed. Because of this method, the calculation is valid to ±15%. The following table summarizes the results:

| AMINE | COATING THICKNESS (angstroms) | % Si—H* REMAINING |
|---|---|---|
| Control - Air Dry Only | 4080 | 100 |
| Control - Air Dry and Precure | 2917 | 100 |
| Pyridine | 2710 | 38 |
| Imidazole (25 wt % in IPA) | 2814 | 25 |
| Saccharin (16.6 wt % in diglyme) | 2835 | 30 |
| Butylamine (neat) | 2869 | 6 |
| DABCO (25 wt % in toluene) | N/A | 8 |
| TMSI (neat) | 2892 | 20 |
| Choline Acetate (5 wt % in IPA) | 2602 | 63 |
| Diethylhydroxylamine | 2759 | 6 |
| M-pyrol | 2745 | 56 |
| Imidazole (25% in diglyme) | 2814 | 14 |
| Toluene | N/A | 87 |

*All values are ± 15%.
IPA = isopropyl alcohol; DABCO = triethylenediamine: TMSI = trimethylsilylimidazole; M-pyrol ™ = n-methylpyrolidone

EXAMPLE 2

H-resin, prepared by the method of Collins et al., U.S. Pat. No. 3,615,272, was diluted to 16 weight percent solids in cyclic dimethylsiloxanes with NO platinum. A 4 inch square silicon wafer was coated with this solution and spun at 3000 rpm for 10 seconds. The wafer was allowed to dry for about 3 hours. A portion of the wafer was precured at 250° C. for 1 hour. The other portion of the wafer which was not precured was placed upside down for 30 minutes over a beaker of boiling butylamine (vaporization point 77.8° C.). The wafer was then rinsed with dry toluene and heated at 100° C. for 1 hour.

The portion of the wafer which was precured was exposed to liquid butylamine and octylamine in the same manner as example 1 followed by rinsing with dry toluene and heating to 100° C. for 1 hour. The amount of SiH remaining after the above treatments was measured in the same manner as Example 1. The following table summarizes the results:

| AMINE TREATMENT CONDITIONS | COATING THICKNESS (angstroms) | % Si—H* REMAINING |
|---|---|---|
| Control - Air Dry Only | 4792 | 100 |
| Control - One Hour at 250° C. | 4349 | 100 |
| Butylamine Vapor - No Heating | — | 90 |
| Butylamine Vapor + 1 hr @ 100° C. | — | 0 |
| Butylamine Soak + 1 hr @ 100° C. | — | 79 |
| Butylamine Soak + 1 hr @ 100° C. + 1 hr @ 200° C. | — | 4 |
| Octylamine soak + 1 hr @ 100° C. | 4283 | 71 |

*The values are ± 15%.

EXAMPLE 3

4 inch silicon wafers were coated with (1) methyl silsesquioxane resin (C resin) made by the mixing 28.5 g of colloidal silica in water (Nalco 1041 TM) with 51.2 g of isopropyl alcohol and 20.3 g of methyltrimethoxysilane. (2) Accuglas 108 TM, (3) Accuglas 203 TM and (4) Accuglas 305 TM. (The Accuglas products are silicon-oxygen backbone polymers which contain a small percentage of either silicon-methyl or silicon-phenyl bonds, depending on the product). The wafers were coated by applying the above resins on the wafer and spinning at 3000 rpm for 10 seconds. The coating was allowed to air dry for 15 minutes then precured at 100° C. for 15 minutes. The wafer was then divided into 1 inch square pieces and exposed to the amine.

The wafer pieces were exposed to either butylamine, diethylhydroxylamine or octylamine. Butylamine and diethylhydroxylamine exposures were in the same manner as Example 1. Octylamine exposure was accomplished by placing the wafer upside down over a beaker of boiling octylamine. Each of the above pieces were washed with dry toluene and then heated to 100° C. for 1 hour.

The amount of SiOH remaining after the above procedure was measured by comparing the FTIR Si-OH peak at 920cm$^{-1}$ before and after the above procedure and then calculating the percentage that was removed. Because of this method, the calculation is valid to ±15%. The following table summarizes the amount of SiOH remaining after the treatment.

| AMINE TREATMENT CONDITIONS | COATING THICKNESS (angstroms) | % Si—OH* REMAINING |
|---|---|---|
| Accuglas 108 | | |
| 15 min @ 100° C. | 4551 | 100 |
| Butylamine | 4498 | 34 |
| Diethylhydroxylamine | 4396 | 22 |
| octylamine vapors for 6 hrs | 4611 | 0 |
| 1 hr @ 400° C. | 4412 | 0 |
| Accuglas 203 | | |
| 15 min @ 100° C. | 3907 | 100 |
| Butylamine | 3453 | 65 |
| Diethylhydroxylamine | 3350 | 59 |
| octylamine vapors for 6 hrs | 3201 | 62 |
| 1 hr @ 400° C. | 3146 | 7 |
| Accuglas 305 | | |
| 15 min @ 100° C. | 4308 | 100 |
| Butylamine | 4061 | 78 |
| Diethylhydroxylamine | 3906 | 38 |
| octylamine vapors for 6 hrs | 3850 | 18 |
| 1 hr @ 400° C. | 3829 | 0 |
| C-resin | | |
| 15 min @ 100° C. | 5735 | 100 |
| Butylamine | 5847 | 0 |
| Diethylhydroxylamine | 3379 | 7 |
| octylamine vapors for 6 hrs | 5298 | 25 |
| 1 hr @ 400° C. | 4066 | 0 |

*values are ± 15%

EXAMPLE 4

Comparative

H-resin, prepared by the method of Collins et al., U.S. Pat. No. 3,615,272, was diluted to 4 weight percent solids in cyclohexane. 1 mL aliquots of the solution were concentrated, by evaporation under an argon atmosphere. To these aliquots were added separately 1 mL solutions of 1% by weight diethylhydroxylamine, n-octylamine, dioctylamine and trioctylamine. The above aliquots were then further concentrated under argon and then flow coated on salt shims. "Q" panels and glass microscope slides. These coatings were allowed to cure on an open lab bench for several hours. The resultant coatings were fragmented, fractured and/or bubbled.

This example shows that when amines are added &o the coating solution, the resultant ceramic coatings do not have desirable characteristics.

That which is claimed is:

1. A method of forming a ceramic coating on an electronic device comprising:
   coating said device with a solution comprising a solvent and hydrogen silsesquioxane resin;
   evaporating said solvent to deposit a hydrogen silsesquioxane resin coating on said device;
   exposing said coating to an environment comprising an amine and moisture to catalyze the conversion of the coating; and
   subjecting the catalyzed coating to a temperature sufficient to facilitate conversion of said coating to a ceramic coating.

2. The method of claim 1 wherein the solvent is selected from the group consisting of alcohols, aromatic hydrocarbons, alkanes, ketones, esters, glycol ethers or cyclic dimethylsiloxanes and wherein said solvent is present in an amount sufficient to dissolve the hydrogen silsesquioxane to between about 0.1 and about 50 weight percent.

3. The method of claim 2 wherein the catalyzed coating is subjected to a temperature of about 20° to about 400° C. for up to about 6 hours.

4. The method of claim 3 wherein the solution also contains a modifying ceramic oxide precursor comprising a compound containing an element selected from the group consisting of titanium, zirconium, aluminum, tantalum, vanadium, niobium, boron and phosphorous wherein the compound contains at least one hydrolyzable substituent selected from the group consisting of alkoxy or acyloxy and the compound is present in an amount such that the final ceramic coating contains 0.1 to 30 percent by weight modifying ceramic oxide.

5. The method of claim 3 wherein the solution also contains a platinum or rhodium catalyst in an amount of about 15 to about 500 ppm platinum or rhodium based on the weight of hydrogen silsesquioxane.

6. The method of claim 4 wherein the solution also contains a platinum or rhodium catalyst in an amount of about 15 to about 500 ppm platinum or rhodium based on the weight of hydrogen silsesquioxane.

7. The method of claim 3 wherein the coating is exposed to an environment comprising a liquid amine and moisture and the method of exposure is by immersion.

8. The method of claim 7 wherein the coating is exposed to the liquid amine for up to about 6 hours at a temperature of between about 20° C. and the boiling point of the amine.

9. The method of claim 8 wherein the exposure is for about 1-3 hours at about 20°-200° C.

10. The method of claim 9 wherein the catalyzed coating is subjected to a temperature of between about 20° and about 200° C. for between about 0.5 and 6 hours.

11. The method of claim 3 wherein the coating is exposed to amine vapors and moisture for up to about 6 hours at a temperature of between about 20° C. and 400° C.

12. The method of claim 11 wherein the exposure is for about 1-3 hours at about 20° to about 200° C.

13. The method of claim 12 wherein the catalyzed coating is subjected to a temperature of between about 20° and about 200° C. for between about 0.5 and 6 hours.

14. A method of forming a ceramic coating on an electronic device comprising:
coating said device with a solution comprising a solvent and hydrolyzed or partially hydrolyzed $R_xSi(OR)_{4-x}$, wherein R is an aliphatic, alicyclic or aromatic substituent of 1-20 carbon atoms and x is 0-2;
evaporating said solvent to deposit a preceramic coating of hydrolyzed or partially hydrolyzed $R_xSi(OR)_{4-x}$ on said device;
exposing said preceramic coating to an environment comprising an amine and moisture to catalyze the conversion of the preceramic coating, provided the amine is not an alkanol amine; and
subjecting the catalyzed preceramic coating to a temperature sufficient to facilitate conversion of said preceramic coating to a ceramic coating.

15. The method of claim 14 wherein the solvent is selected from the group consisting of alcohols, aromatic hydrocarbons, alkanes, ketones, esters, glycol ethers or cyclic dimethylsiloxanes and wherein the solvent is present in an amount sufficient to dissolve the hydrolyzed or partially hydrolyzed $R_xSi(OR)_{4-x}$ to between about 0.1 and about 50 weight percent.

16. The method of claim 15 wherein the catalyzed preceramic coating is subjected to a temperature of about 20° to about 400° C. for up to about 6 hours.

17. The method of claim 16 wherein the solution also contains a modifying ceramic oxide precursor comprising a compound containing an element selected from the group consisting of titanium, zirconium, aluminum, tantalum, vanadium, niobium, boron and phosphorous wherein the compound contains at least one hydrolyzable substituent selected from the group consisting of alkoxy or acyloxy and the compound is present in an amount such that the final ceramic coating contains 0.1 to 30 percent by weight modifying ceramic oxide.

18. The method of claim 16 wherein the preceramic coating is exposed to an environment comprising a liquid amine and the method of exposure is by immersion.

19. The method of claim 18 wherein the preceramic coating is exposed to the liquid amine for up to about 6 hours at a temperature of between about 20° C. and the boiling point of the amine.

20. The method of claim 19 wherein the exposure is for about 1-3 hours at about 20°-200° C.

21. The method of claim 20 wherein the catalyzed preceramic coating is subjected to a temperature of between about 20° and about 200° C. for between about 0.5 and 6 hours.

22. The method of claim 16 wherein the preceramic coating is exposed to amine vapors for up to about 6 hours at a temperature of between about 20° C. and 400° C.

23. The method of claim 22 wherein the exposure is for about 1-3 hours at about 20° to about 200° C.

24. The method of claim 23 wherein the catalyzed preceramic coating is subjected to a temperature of between about 20° and about 200° C. for between about 0.5 and 6 hours.

* * * * *